United States Patent [19]
Kilroy

[11] Patent Number: 4,551,346
[45] Date of Patent: Nov. 5, 1985

[54] METHOD OF PRODUCING AN EDIBLE FAT EMULSION AND FOOD PRODUCT PRODUCED THEREOF

[75] Inventor: Stanley A. R. Kilroy, Mitcham, Australia

[73] Assignee: Alpen Dairy Foods Pty. Limited, Victoria, Australia

[21] Appl. No.: 513,968
[22] PCT Filed: Nov. 11, 1982
[86] PCT No.: PCT/AU82/00183
§ 371 Date: Jun. 30, 1983
§ 102(e) Date: Jun. 30, 1983
[87] PCT Pub. No.: WO83/01728
PCT Pub. Date: May 26, 1983

[30] Foreign Application Priority Data

Nov. 11, 1981 [AU] Australia ............... PF1515

[51] Int. Cl.$^4$ ............... A23D 3/00; A23D 3/02
[52] U.S. Cl. ............... 426/602; 426/603; 426/613
[58] Field of Search ............... 426/602, 603, 604, 613

[56] References Cited

U.S. PATENT DOCUMENTS 3,692,630  9/1972  Kichline et al. ............... 426/582 X
3,922,376 11/1975  Strinning et al. ............... 426/603
3,946,122  3/1976  Scharp ............... 426/604
4,071,634  1/1978  Wilton et al. ............... 426/604
4,092,438  5/1978  Tonner ............... 426/613
4,239,786 12/1980  Gilmore et al. ............... 426/613 X

FOREIGN PATENT DOCUMENTS 1616276  7/1976  Australia .
1074176  3/1980  Canada .

Primary Examiner—Robert Yoncoskie
Attorney, Agent, or Firm—Finnegan, Henderson, Farabow, Garrett & Dunner

[57] ABSTRACT

A food product formed from edible fat, particularly a spreadable, refrigerated product of butter fat, by preparing a premix of casein and/or a casein derivative, an aqueous carrier and a peptizing agent and forming a sol by agitating and heating the premix to at least 80° C. to peptize all the casein. The fat is then mixed with the sol. The product formed may be used as such for mixing with other products or spraying or even spray dried, but it is unstable and may be stabilized by crystallizing the fat followed by mixing with further peptizing agent and heating to at least 80° C. The stabilized product is then packaged hot, chilled to recrystallize the fat and may be rewarmed to about 20° C. before the product is stored at 5° C.

15 Claims, 1 Drawing Figure

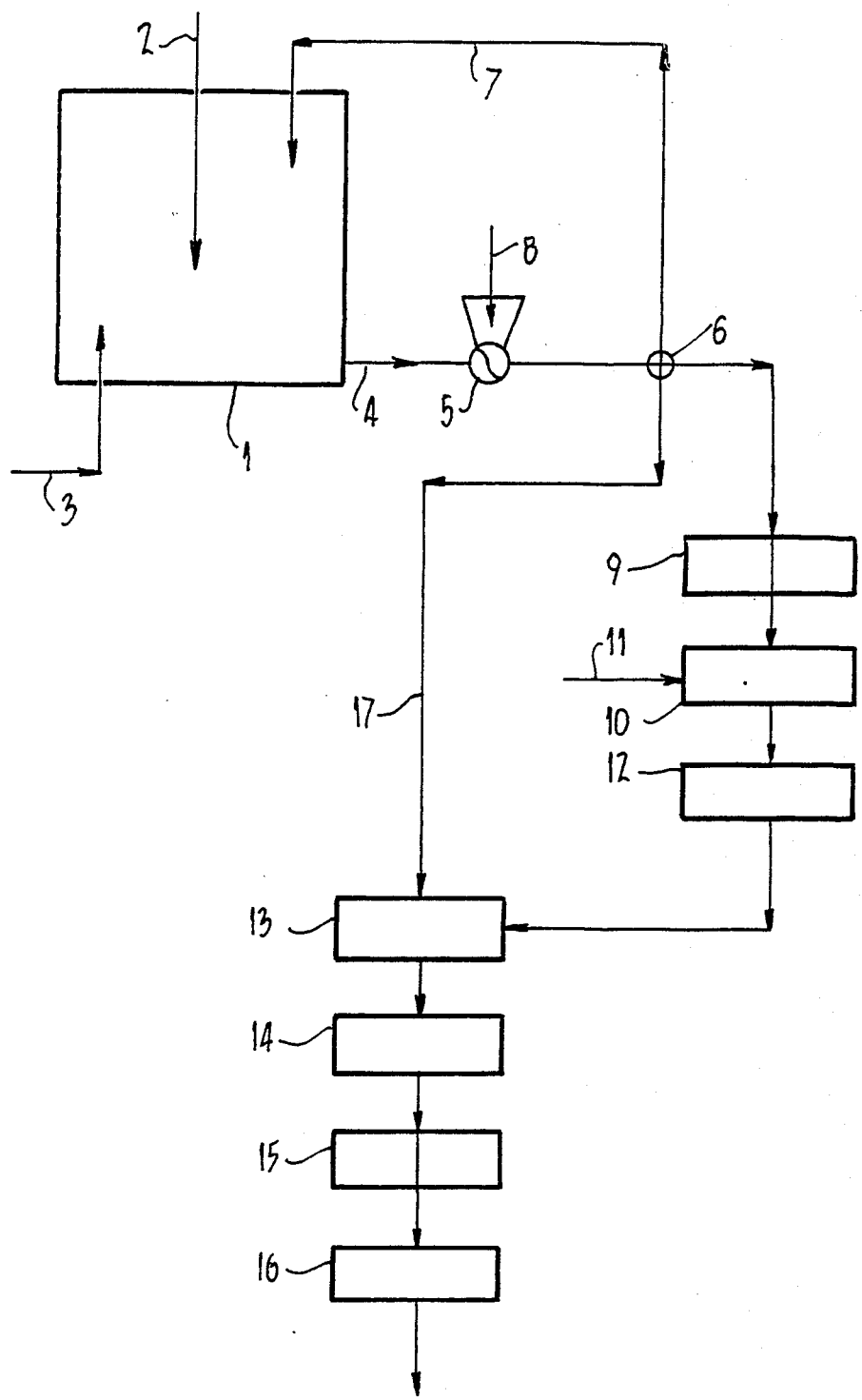

METHOD OF PRODUCING AN EDIBLE FAT EMULSION AND FOOD PRODUCT PRODUCED THEREOF

TECHNICAL FIELD

The present invention relates to food products including edible fats and is particularly but not exclusively concerned with spreadable products such as butter and margarine.

BACKGROUND OF THE INVENTION

Dairy butter is a common food product in many parts of the world and is made by a traditional process which varies only slightly from country to country. Basically, the process involves agitation of cream derived from milk to cause separation of the butter fat from milk serum and milk solids of a non fat nature. At the separation stage, globules of milk fat agglomerate to form a solid mass which includes reduced moisture—e.g. approximately 16%—and only a small proportion of solids of a non fat nature. The residual constituents of the original body of cream are drained as butter milk.

The solid body of butter may be subjected to further processing or working after separation and certain additives such as salt may be introduced. The resulting product may be stored under refrigeration.

A common use of the resulting product is as a spread, but its characteristics are such that it is not well suited for that use. As indicated above, it is usual to store dairy butter under refrigerated conditions, but it firms and hardens at a temperature below 15 degrees Celsius and has such a low coefficient of heat transfer as to be slow to soften at higher ambient temperatures encountered upon removal from a refrigerator. Deliberate heating creates other problems due to separation of the constituents and an unattractive oily appearance, and for these and other reasons dairy products can be difficult to handle at temperatures above approximately 30 degrees Celsius.

As a result, there has been a long standing need for dairy butter to have better spreading characteristics at refrigeration temperatures.

It has been observed that natural cheese such as cheddar, containing 50% or more milk fat, when comminuted and emulsified with phosphates, citrates or similar salts and heated under agitation to produce so called "processed cheese" (a commonly manufactured product), can be induced to retain a soft spreadable consistency even when maintained at refrigeration temperatures after manufacture. It has been found that this phenomenon is related to the condition of the casein in the cheese to be processed, and the effect of the emulsifying salts on the casein to produce chains of peptised casein molecules resulting in what is referred to as a short body structure.

The manufacturing procedure for the "processed cheese" includes a heating stage, and it has been found to be not possible to process natural dairy butter in the same manner as cheese since the admixture of emulsifying salts with the butter prior to heating results in separation of the components as the fat component inhibits the action of the emulsifier on the casein. Other preblended fats such as vegetable fats or oils with casein and other components are equally resistant to processing in a similar manner.

In spite of extensive investigation into the production of a spreadable refrigerated butter, no such process has heretofore been found, and it is an object of the present invention to provide a method of producing such a food product.

STATEMENT OF INVENTION

According to the present invention there is provided a method of producing a food product which comprises the steps of preparing a premix comprising casein and/or a caseinate derivative, a liquid carrier and an emulsifying agent such as to disperse the casein and/or caseinate derivative into a colloidal form in the liquid carrier and to obtain peptisation of the casein and/or caseinate derivative, agitating and heating the premix to a temperature and for a time sufficient to complete the action of the emulsifying agent, and homogeneously mixing with the premix an edible fat to provide the product.

Further according to the present invention, there is provided a food product when produced by the method disclosed in the immediately preceding paragraph.

Preferably the premix is heated to a temperature in the range of 80 degrees Celsius to 110 degrees Celsius in order to pasteurize or even sterilize the ingredients by, for example, direct injection of culinary steam. Such steam may be injected direct into a premixing vessel, and the premix may be recirculated out of and back through the vessel by suitable pump means to ensure thorough dispersion and the casein or caseinate derivative is conveniently added during such recirculation. The edible fat content may be added exteriorly of the vessel, through, for example, the pump means, or directly into the vessel.

The premix may be stored prior to mixing with the edible fat in which case, it may be reheated to a temperature of at least 80 degrees Celsius on mixing with the edible fat. Preferably, however, the edible fat is thoroughly mixed with the prepared premix immediately after preparation so that said mixing may commence at an elevated temperature, for example of at least 80 degrees Celsius.

The edible fat may be natural dairy butter churned from either sweet cream or cultured cream, with or without the addition of salt as NaCl, in the final product and having an approximate analysis of 80% butter fat, 2% curd, 2% salt (as NaCl) and 16% moisture. However, butter oil suitably recombined with dairy solids and/or stabilizers may be utilized in the same manner as butter, as may butter oil or vegetable oil alone. The preferred edible fat is natural dairy butter.

The casein component may be casein curd either lactic or acid, precipitated from wholesome skimmed milk or the caseinate derivatives of such casein, (for example Sodium, Calcium or Potassium) prepared as a food in a hygienic manner. Alternatively, milk powders such as skim milk, butter milk, etc. comprising sufficient casein may be substituted or used as an admixture. The casein or caseinate derivative may be added in any mixture of the aforementioned products. The preferred component is Sodium Caseinate.

The emulsifying agent may comprise casein peptising salts such as phosphates or citrates separately or blended in a suitable proportion and selected from the salts of Citric Acid (Citrates) and the salts of polyphosphoric acid (Polyphosphates) or monophosphoric acid (Monophosphates) or such other agent as will function in a similar manner to disperse the casein into a finely divided colloidal form in water or other liquid carrier and also enable the acidity of the compound to be adjusted by their selection. The preferred salt varies in accordance with the acidity etc. of the other components but is substantially a phosphate mixed with a proportion of Citrates.

The liquid carrier may be clean potable water and/or milk or its by-products such as skimmed milk, and/or butter milk and/or whey. Such milk products may be incorporated in their natural state or recombined from dry powder. The preferred liquid carrier is butter milk either freshly produced or recombined from powder containing approximately 6% solids.

The product formed by the combination of the premix and edible fat may be somewhat lacking in texture, mouth feel, colour and taste and may also be unstable over an extended period. Nevertheless, the product may have several valuable applications in its liquid condition including its ability to be readily combined with other food products as a baking additive etc. or as a fat compound readily sprayed onto an edible substrate or spray dried. It is however capable of ongoing processing in several modes to render it a stable liquid or sol or, alternatively, a stable gel most suitable for spreading.

Where the edible fat comprises butter oil, which has enhanced keeping qualities over natural dairy butter while having a natural butter flavour and colour and also is of a reduced volume allowing for more economical transport, the product of the fat and premix may be packaged hot under a hermetic seal. Such packaged product is preferably refrigerated and reduced to freezing or fat crystallization temperature prior to storage at 5 degrees Celsius and while the product may provide an alternative food it will have a texture and colour somewhat different from the process incorporating natural dairy butter. It is believed a similar process may be followed with vegetable oil to produce different food products.

The ongoing processing comprises, in the preparation of a stable liquid where the edible fat comprises butter, the addition to the product of further emulsifying salts of a similar type and nature to those utilized in the preparation of the premix, for example Citrate and Phosphate salts, preferably as an ongoing process and the reheating either directly or indirectly of the new product to at least 80 degrees Celsius for a period sufficient to peptise the curd fraction of the butter added to the premix.

The emulsion thus formed will result in a stable sol or liquid which is cooled and is capable of being stored for extended periods at approximately 5 degrees Celsius.

The ongoing processing comprises, in the case of the preparation of a spreadable gel where the edible fat is butter, an alternative mode of temperature treatment followed by the addition of further salts and further temperature manipulation such that the product of premix and fat is cooled after its preparation to a temperature of approximately −4 degrees Celsius or the temperature of fat crystallization. The product so derived on warming to 5 degrees Celsius has a soft spreadable consistency but is unstable on being raised in temperature above 5 degrees Celsius and moisture will separate. However, it may be further processed by heating indirectly to a temperature of approximately 5 degrees Celsius to enable the convenient addition and combination of a further fraction of emulsifying salts of the same or similar nature as those added to the premix. The new product is then subjected to indirect heating in order to peptise the curd fraction of the butter added to the premix and under continued agitation is heated to at least 80 degrees Celsius. Additional moisture in the form of clean potable water may be added during this stage, particularly as a vehicle to convey the emulsifying salts and aid their rapid dispersion.

The emulsion thus produced is preferably packaged after being homogeneously mixed for the required period into hermetically sealed containers to utilize the heat and sol characteristics to facilitate the packaging and partial vacuum so formed on the cooling of the emulsion.

The packaged product is subsequently cooled by air, followed by refrigerating to approximately −4 degrees Celsius to crystallize the fat.

After refrigerating it may be found that the colour, texture and mouth feel may not equal butter of a similar consistency. Thus, the packaged product may be subjected to a further process by allowing the packaged product to be elevated in temperature gradually to approximately 20 degrees Celsius allowing the fat to disperse slightly and reappear in a manner similar to butter and assume largely the attributes of colour, mouth feel, lustre and texture of butter of a similar consistency.

The product formed in accordance with the present invention from vegetable oil or directly from butter oil may be readily spreadable at refrigeration temperatures of 0 degrees Celsius to 5 degrees Celsius and may be used as a spread whether alone or mixed with other food products. However, in order to bring out the full qualities of the product the packaged product may be treated in the same manner as the butter product by chilling it to recrystallize the fat, at a temperature of approximately −4 degrees Celsius, and ensure a satisfactory gel and then allow the product to rewarm to approximately 20 degrees Celsius. The treated product may then be stored at 5 degrees Celsius.

BRIEF DESCRIPTION OF THE DRAWING

One embodiment of a method in accordance with the present invention will now be described by way of example only with reference to the accompanying drawing which illustrates essentially in block manner the process stages.

DESCRIPTION OF PREFERRED EMBODIMENT

The process of the present invention will be described with reference to the drawing in the manufacture of a spreadable refrigerated butter. A premix is prepared in the vessel 1 by adding at 2 a liquid carrier such as water or butter milk, together with phosphate and/or citrate emulsifying salts and blending by mechanical agitation in vessel 1 and recirculation through conduit 4 and by pump 5 via valve 6 and conduit 7. During the recirculation stage other ingredients including casein or caseinate and other powdered additives are introduced at 8 and the process of combining continued while culinary steam is injected at 3. The agitation and heating are carried out to a temperature and for a time sufficient to complete the action of the emulsifiers is finely dividing and peptising the casein and/or caseinate derivative. Preferably the temperature is taken to at least 80 degrees Celsius to pasteurize or even sterilize the premix.

On completion of the premixing stage, natural dairy butter is introduced directly into the vessel 1 or at 8 into pump 5 to be combined with the hot premix. The butter is preferably added at approximately 5 degrees Celsius to cool the premix emulsion during the combining process and the butter and premix is mechanically blended to a homogeneous emulsion.

The product so prepared may be discharged from the process via valve 6 and may be used in a liquid condition for mixing with other products, spraying onto an edible substrate or to be spray dried. However, to stabilize the product the emulsion so formed is directed via valve 6 to chamber 10 where it is combined with a further quantity of emulsifying salts added at 11 and the mixture so formed is heated at 12 to at least 80 degrees Celsius or above to peptise the curd fraction of the butter previously added to the premix. The components are homogeneously combined and mixed for a period to ensure complete peptisation of all casein molecules.

The emulsion so formed may be discharged and cooled for prolonged storage at 5 degrees Celsius as a stable product in a liquid or sol form.

Alternatively to the immediately foregoing process, the product of butter and premix may be directed via valve 6 into a cooler 9 where the product is cooled to approximately −4 degrees Celsius or to such temperature at which the fat crystallizes. The refrigerated product is then heated slightly and is combined in chamber 10 with further emulsifying salts, of a similar nature to those previously added to the premix, added at 11. The mixture so formed is heated to at least 80 degrees Celsius or above at 12 and the components homogeneously combined and mixed for a period to ensure complete peptisation of all casein molecules.

The heated product may now be packaged and hermetically sealed at 13 and cooled at 14 to −4 degrees Celsius or to such alternative temperature at which the fat crystallizes, followed by storage at 16 at up to 5 degrees Celsius. It may be found, however, that the product does not have the colour, texture and mouth feel of natural butter of a similar consistency, and this may be produced to a considerable degree by allowing at 15 the packaged product to rise in temperature to approximately 20 degrees Celsius or such temperature at which the crystallized butter fat disperses sufficiently to assume the colour and texture of natural butter.

The packaged product is finally stored at 0 to 5 degrees Celsius and will remain stable for an extended period.

If butter oil or vegetable oil is used as the edible fat, it is believed that it may not be necessary for the stabilization steps 9 to 12 to be carried out so that the product is transferred direct from the valve 6 to be packaged at 13 as shown by the path 17, and then treated as per the steps 14 to 16.

In practice in producing a spreadable butter like product, 1 kg of sodium caseinate and 180 g of a mixture of citrate and phosphate emulsifying salts together with 4½ kg of butter milk are added to the vessel 1 and are thoroughly blended and injected with culinary steam to 95 degrees Celsius. This premix is agitated and may be recirculated for approximately 10 minutes to ensure the thorough peptisation of the casein component and dispersion in the emulsion so formed. 8 kg of natural dairy butter at a temperature of approximately 5 degrees Celsius is added to the hot premix. The premix and butter are homogeneously combined by agitation and may be recirculated through the vessel 1. Steam is no longer introduced into the vessel when the butter is added and the product is cooled by the addition of the butter. The product is discharged through valve 6 and is further cooled either in a batch of preferably continuously in a swept surface heat exchanger 9 to a temperature of approximately −4 degrees Celsius. The cooled emulsion is then pumped or otherwise conveyed to a mixing chamber 10 where it is slightly heated and a further 180 g of similar emulsifying salt is thoroughly mixed and dispersed throughout the emulsion.

The mixture is then pumped or otherwise conveyed to a separate heat exchanger 12 where it is heated by indirect heat to pasteurize or sterilize the butter component above 80 degrees Celsius. The product is then packaged hot at 13 and hermetically sealed into containers. The packaged product is then cooled at 14 to −4 degrees Celsius and is subjected at 15 to the heat treatment elevating the temperature to 20 degrees Celsius. Finally at 16 the product is stored at 0 to 5 degrees Celsius.

The foods produced in accordance with the foregoing processes may have their flavours enhanced or modified by the addition of suitable additives during any of the stages of manufacture but preferably during the secondary heating phase 10 to 12.

The claims defining the invention are as follows:

I claim:

1. A method of producing a food product containing an edible fat which comprises the steps of
   a. preparing a premix comprising casein and/or a casein derivative, an aqueous carrier and an effective amount of peptising agent,
   b. agitating and heating the premix to a temperature of at least about 80° C. for a time effective to peptise the casein and/or casein derivative and thereby provide a sol,
   c. homogeneously mixing with the sol an edible fat containing casein to obtain a mixture,
   d. cooling the mixture to a temperature below 5° C. sufficient to obtain a gel and crystallize the fat within said mixture,
   e. stabilizing the mixture by adding further effective amounts of peptising agent thereto and homogeneously mixing and heating the resultant further mixture to a temperature of at least 80° C. to obtain a further mixture in which the added casein molecules have been peptised,
   f. cooling the further mixture to a temperature below 5° C. sufficient to obtain a further gel and recrystallize the fat within said further mixture,
   g. warming the cooled further mixture to a temperature of about 20° C. to redistribute the fat in said further mixture, and
   h. storing the resultant food product at a temperature up to about 5° C.

2. The method of claim 1 in which the premix is heated by direct steam injection.

3. The method of claim 1 in which the edible fat containing casein is added at a temperature of about 5° C. to the heated sol.

4. The method as claimed in claim 1 in which the peptising agent in the premix is a phosphate and/or a citrate salt.

5. A method of claim 1 in which the casein in the premix is selected from the group consisting of fresh milk product, powdered milk product, sodium caseinate, calcium caseinate, potassium caseinate and mixtures thereof.

6. The method of claim 1 in which the aqueous carrier is selected from the group consisting of water, buttermilk, skim milk, whole milk and mixtures thereof.

7. The method of claim 1 in which the mixture of step d is rewarmed to about 5° C. prior to being stabilized by adding the further peptising agent thereto.

8. The method of claim 1 in which the further peptising agent is of the same type as the peptising agent used in the preparation of the premix.

9. The method of claim 1 in which said heating of the further mixture containing the further peptising agent is conducted to a sterilizing temperature.

10. The method of claim 1 in which prior to said recrystallizing step in step f the further mixture is packaged hot.

11. A food product formed by the method claimed in claim 1.

12. The method of claim 1 in which the edible fat containing casein is selected from the group consisting of whole dairy butter and reconstituted butter.

13. The method of claim 1 in which the casein is added to the premix as sodium caseinate and the peptising agent is added to the premix as a mixture of citrate and phosphate salts and wherein the ratio of said sodium caseinate and peptising agent additions is 1:0.18.

14. The method of claim 1 in which the edible fate containing casein is natural butter and wherein the ratio of natural butter and further peptising agent additions is 8:0.18.

15. The method of claim 1 in which the temperature of the mixture and of the further mixture is reduced to about −4° C. during the respective cooling stage.

* * * * *